United States Patent [19]
Albrecht et al.

[11] Patent Number: 5,200,867
[45] Date of Patent: Apr. 6, 1993

[54] TRANSDUCER CARRIER FOR DISK FILE WITH LIQUID FILM HEAD-DISK INTERFACE

[75] Inventors: Thomas R. Albrecht, San Jose; John S. Foster; Andrew M. Homola, both of Morgan Hill, all of Calif.

[73] Assignee: International Business Machines Corporation, Armonk, N.Y.

[21] Appl. No.: 724,696

[22] Filed: Jul. 2, 1991

[51] Int. Cl.⁵ .................. G11B 5/60; G11B 17/02
[52] U.S. Cl. .................. 360/103; 360/97.01; 360/97.02
[58] Field of Search ............... 360/97.01, 97.02, 97.03, 360/103

[56] References Cited

U.S. PATENT DOCUMENTS

| | | | |
|---|---|---|---|
| 2,969,435 | 1/1961 | Lynott | 179/100.2 |
| 3,005,675 | 10/1961 | Ledin et al. | 346/74 |
| 3,060,431 | 10/1962 | Fuller et al. | 346/74 |
| 4,167,765 | 9/1979 | Watrous | 360/103 |
| 4,367,503 | 1/1983 | Treseder | 360/103 |
| 4,556,969 | 12/1985 | Treseder et al. | 360/291 |
| 4,633,351 | 12/1986 | Bardos et al. | 360/102 |
| 4,894,740 | 1/1990 | Chhabra et al. | 360/103 |
| 4,901,185 | 2/1990 | Kubo et al. | 360/104 |
| 5,097,368 | 3/1992 | Lemke et al. | 360/103 |

FOREIGN PATENT DOCUMENTS

| | | | |
|---|---|---|---|
| 2010836 | 2/1990 | Canada | |
| 367510 | 5/1991 | European Pat. Off. | |
| 60-202538 | 10/1985 | Japan | |
| 61-48182 | 3/1986 | Japan | 360/103 |
| 0250376 | 2/1990 | Japan | |

OTHER PUBLICATIONS

IBM Technical Disclosure Bulletin, vol. 26, No. 1, Jun. 1983, p. 398 C. J. Mastrangelo, "Plasma Ash or Laser Burn Pattern of Submicron . . . ".
IBM Technical Disclosure Bulletin, vol. 28, No. 2, Jul. 1985, pp. 796–797, M. R. Lorenz, "Lubricant-Stabilizing Structure for Magnetic Disks".

Primary Examiner—Robert S. Tupper
Attorney, Agent, or Firm—Thomas R. Berthold

[57] ABSTRACT

A disk file with substantially reduced head-disk spacing and corresponding improvement in recording performance uses a disk coated with a film of conventional high viscosity lubricant, a lubricant reservoir for replenishing the lubricant on the disk over the life of the file, and a transducer carrier with feet which ski on the high viscosity liquid film. The file does not include any means for recirculating the lubricant since the lubricant spins off the disk at a relatively low rate due to its high viscosity. The lubricant reservoir contains a very small amount of lubricant and thus may be maintained inside the substantially sealed disk file. In one embodiment of the invention, the sealed disk file is essentially evacuated. The operation of the disk file in a near vacuum environment is possible because, unlike conventional disk files, air is not required to support an air-bearing head-disk interface and the high vapor pressure of the relatively high molecular weight lubricant prevents its evaporation.

9 Claims, 7 Drawing Sheets

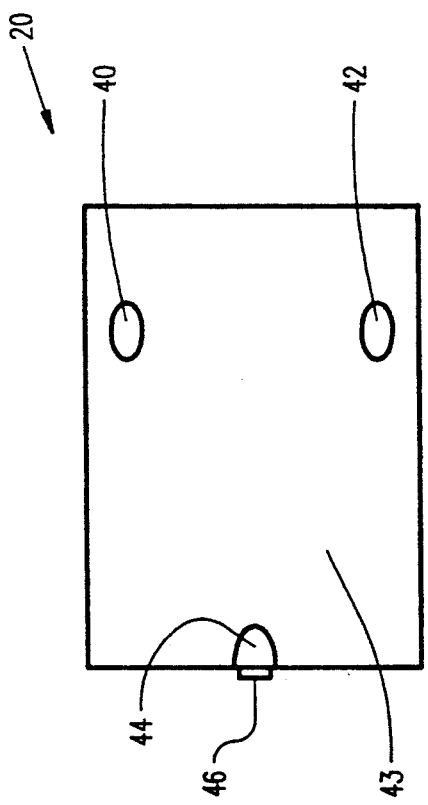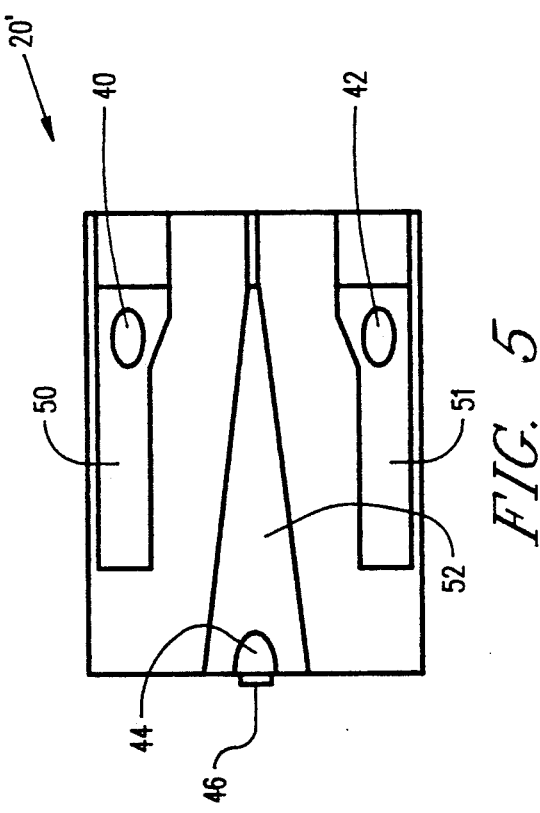

TRANSDUCER CARRIER FOR DISK FILE WITH LIQUID FILM HEAD-DISK INTERFACE

TECHNICAL FIELD

This invention relates to data recording disk files. More particularly, the invention is a new type of disk file wherein the head or transducer carrier and a liquid lubricant on the disk surface provide a new type of head-disk interface.

This application and a co-pending concurrently filed application Ser. No. 07/724,646, are based on a common specification. This application claims the transducer assembly and application Ser. No. 07/724,646 claims the disk file.

BACKGROUND OF THE INVENTION

Disk files, also referred to as disk drives are information storage devices which utilize a rotatable disk with concentric data tracks containing the information, a head or transducer for reading or writing data onto the various tracks, and an actuator connected to a carrier for the head for moving the head to the desired track and maintaining it over the track centerline during read or write operations. There are typically a plurality of disks separated by spacer rings and stacked on a hub which is rotated by a disk drive motor. A housing supports the drive motor and head actuator and surrounds the head and disk to provide a substantially sealed environment for the head-disk interface. In conventional magnetic recording disk files the head carrier is an air-bearing slider which rides on a bearing of air above the disk surface. The slider is urged against the disk surface by a small force from a suspension which connects the slider to the actuator, so that the slider is in contact with the disk surface during start and stop operations when there is insufficient disk rotational speed to maintain the air bearing. A lubricant is required on the disk surface to prevent damage to the head and disk during starting and stopping of the disk file.

The conventional magnetic recording disk file suffers from several disadvantages which are due to the air-bearing head-disk interface. The spacing between the head and disk is limited by the minimum achievable flying height of the air bearing slider, which means the recording performance of the disk file, which is directly related to this spacing, is accordingly limited. When the slider has been in stationary contact with the disk for a relatively short period of time, the liquid lubricant and the relatively large air-bearing surface of the slider create static friction (or "stiction") forces which cause the slider to stick to the disk surface, which can result in damage to the head, disk or suspension when the slider breaks free from the disk at start up of the disk file. The interface, which is primarily a thin film of air when the disk file is operating, provides very little stiffness between the head and disk so that the disk file is very sensitive to vibration and impact, which makes the conventional disk file undesirable for certain applications, such as use in a portable computer. The air required inside the disk file to support the air-bearing slider also increases the air drag on the rotating disks, thereby increasing the power consumption, contributes to the noise level in the outside environment, causes buffeting of the suspension, and increases the corrosion and oxidation of the heads, disks and electronic components.

There are several references which describe different types of head carriers and liquid bearings as possible alternatives to the conventional air-bearing head-disk interface in magnetic recording disk files. In assignee's U.S. Pat. No. 2,969,435, a sled-type transducer carrier with a large flat surface rides on a layer of oil on the disk, the oil being supplied from an oil reservoir external to the disk file and discharged from a nozzle located ahead of the carrier. In assignee's pending application, U.S. Ser. No. 264,604, filed Oct. 31, 1988, and published May 9, 1990 as European published application EP 367510, a disk file utilizes a continuously recirculating low viscosity liquid lubricant, which is maintained as a relatively thick layer on the disk, and a transducer carrier which has triangular shaped feet to plow through the low viscosity liquid layer. The EP reference suggests that if the disk file is hermetically sealed with no air present the low vapor pressure lubricant can evaporate which allows the required recirculation of the lubricant to occur by distillation.

What is needed is a disk file with a liquid bearing interface which provides minimal head-disk spacing and which does not require continuous recirculation of the lubricant.

SUMMARY OF THE INVENTION

The present invention is a disk file having a disk coated with a film of conventional high viscosity lubricant, a lubricant reservoir for replenishing the lubricant on the disk over the life of the file, and a transducer carrier having a surface which enables the carrier to ski on the surface of the high viscosity liquid film. The file does not include any means for recirculating the lubricant since the lubricant spins off the disk at a relatively low rate due to its small film thickness and high viscosity. The viscosity of the lubricant is high enough to limit the lubricant loss over the required lifetime of the disk drive to an amount which can be replenished by the reservoir. The lubricant reservoir contains a very small amount of lubricant and thus may be maintained inside the disk file housing. In the preferred embodiment of the invention the reservoir is a sealed ring located near the disk inside diameter and which has a porous interior for holding the lubricant by capillary action and a number of outlets for releasing the lubricant to the disk during rotation of the disk. The preferred surface of the transducer carrier is a plurality of ski feet formed as generally truncated cones which extend from the carrier, the degree of taper of the cones being so gradual as to permit the generally circularly shaped ends of the ski feet to ski on the lubricant film surface. The generally circular shape of the ends of the ski feet improves the operation of the carrier in rotary actuator disk files in which the direction of motion of the carrier relative to the disk varies with the radial position of the carrier on the disk. In one embodiment of the invention, the disk file is sealed and essentially evacuated. The operation of the disk file in a near vacuum environment is possible because, unlike conventional disk files, air is not required to support an air-bearing head-disk interface and the high vapor pressure of the relatively high molecular weight lubricant prevents its evaporation. Thus, the problems associated with the presence of air inside the disk file are substantially minimized.

For a fuller understanding of the nature and advantages of the present invention, reference should be made to the following detailed description taken in conjunction with the accompanying drawings.

BRIEF DESCRIPTION OF THE DRAWINGS

FIG. 4 is a plan view of the bottom of the disk carrier of the present invention;

FIG. 5 is a plan view of the bottom of an air-bearing slider modified to have the ski surface of the present invention;

DESCRIPTION OF THE PREFERRED EMBODIMENTS

Figure 1:
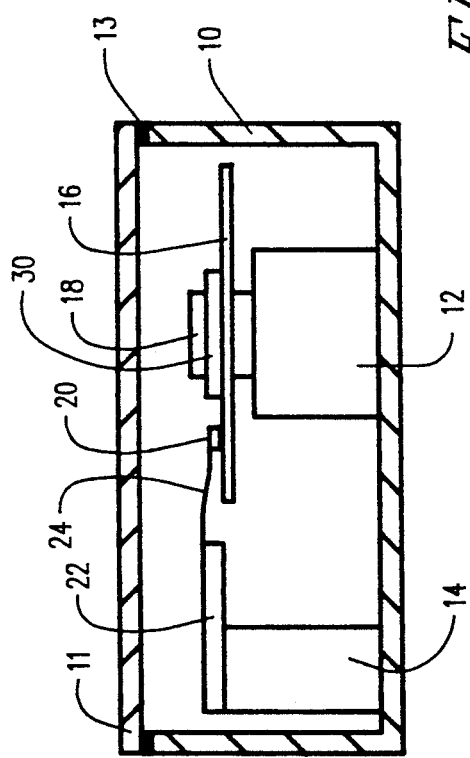
FIG. 1 is a view in section of a schematic of the disk drive of the present invention.

Referring first to FIG. 1, there is illustrated in sectional view a schematic of the disk file of the present invention. The disk file comprises a base 10 to which are secured a disk drive motor 12 and an actuator 14, and a cover 11. The base 10 and cover 11 provide a substantially sealed housing for the disk drive. Typically there is a gasket 13 located between base 10 and cover 11 and a small breather port (not shown) for equalizing pressure between the interior of the disk file and the outside environment. This type of disk file is described as being substantially sealed since the drive motor 12 is located entirely within the housing and there is no external forced air supply for cooling the interior components. A magnetic recording disk 16 is mounted on a hub 18, which is attached for rotation by drive motor 12. A read/write head or transducer (not shown) is formed on a transducer carrier 20. The carrier 20 is connected to the actuator 14 by means of a rigid arm 22 and a suspension 24, the suspension 24 providing a biasing force which urges the transducer carrier 20 onto the surface of the recording disk 16. During operation of the disk file the drive motor 12 rotates the disk 16 at a constant speed, and the actuator 14, which is typically a linear or rotary voice coil motor (VCM), moves the transducer carrier 20 generally radially across the surface of the disk 16 so that the read/write head may access different data tracks on disk 16.

Figure 2:
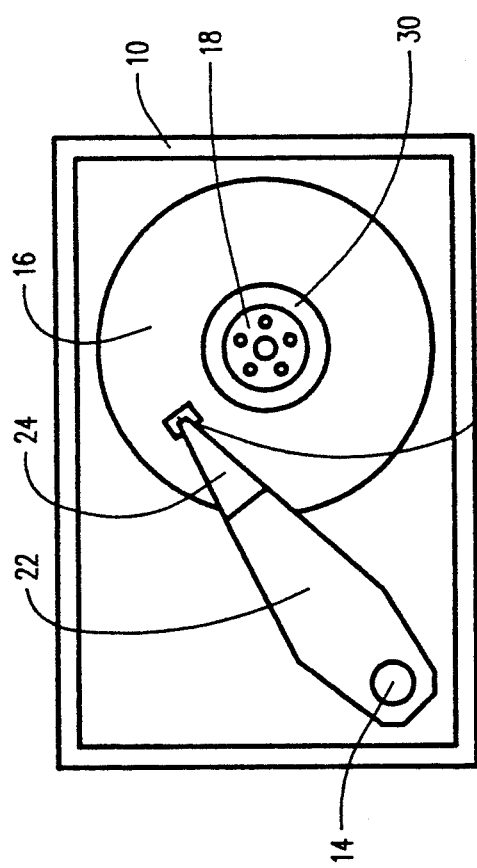
FIG. 2 is an open top view of the disk drive depicted schematically in FIG. 1.

FIG. 2 illustrates a top view of the interior of the disk file with the cover 11 removed and illustrates an annular lubricant reservoir 30, which serves as a means for holding a supply of liquid lubricant for replenishment of lubricant on the surface of disk 16. A thin continuous film of a relatively high viscosity lubricant is maintained on the surface of disk 16 and is replenished by lubricant from the reservoir 30 during operation. FIG. 2 also illustrates in better detail the suspension 24 which provides a force to the carrier 20 to maintain the carrier into contact with the lubricant film on the disk 16. The suspension may be a conventional type of suspension such as that used in magnetic disk files which have an air-bearing slider. An example is the well-known Watrous suspension, as described in assignees' U.S. Pat. No. 4,167,765, which is incorporated herein by reference. This type of suspension also provides a gimballed attachment of the transducer carrier which allows the carrier to pitch and roll as it rides on the liquid lubricant film.

Figure 3:
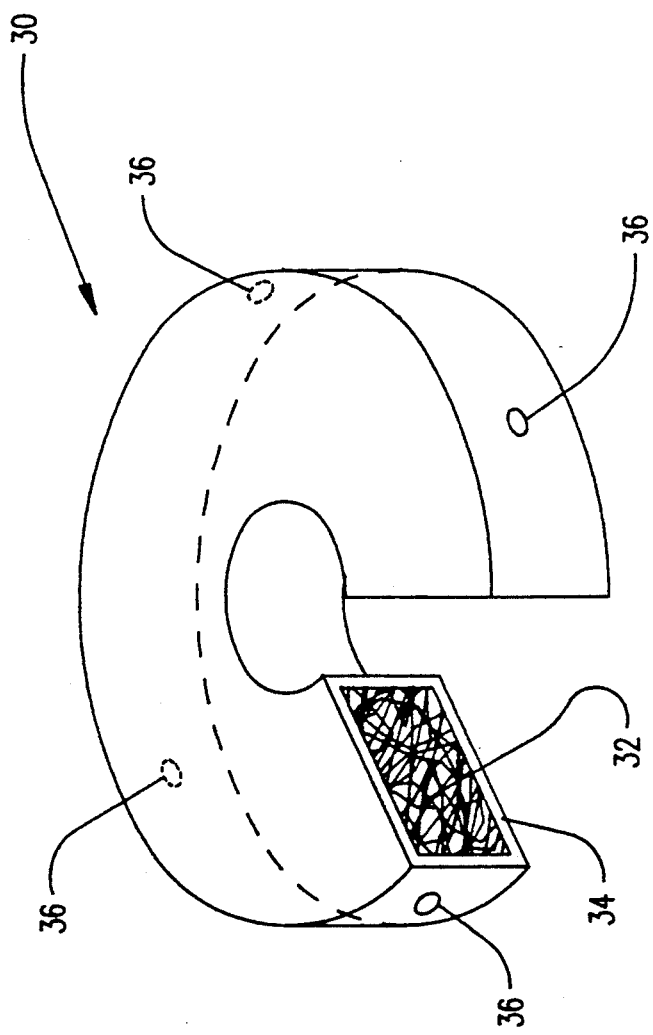
FIG. 3 is a perspective view of the spacer ring lubricant reservoir shown in partial cutaway.

The annular lubricant reservoir 30, which may also serve as a disk spacer in disk files which have multiple disks in a disk stack, is shown in detail in FIG. 3. The reservoir 30 comprises a ring or annulus 32 which is machined from a porous, sintered metal, such as sintered stainless steel. Thereafter the outer surface of the annulus 32 is entirely sealed, either by electroplating a material such as gold or by electroless plating of a nickel film, to provide a film 34 surrounding the sintered stainless steel. Openings 36 are then formed in the gold or nickel surface film 34 to unseal the reservoir and provide a means for the lubricant stored inside to escape. This is accomplished by machining several, e.g. typically 4, small areas on the surface film 34 by etching, ablation or electrostatic discharge machining, which creates the openings 36 or pores in those areas. The reservoir is then filled with lubricant by placing it in a vacuum, immersing it in the lubricant, and heating it slightly to increase the rate at which it fills. The number and size of the openings 36 are selected to provide the desired amount of controlled lubricant escape during operation of the disk file, which is designed to match the rate at which lubricant leaves the disk. When the annulus 32 is designed to also, serve as a spacer ring in disk files which have multiple disks supported in a stack on the hub 18, the openings 36 may be located nearer to the portions of the spacer ring which are in contact with the disks, so that selected openings are associated with one of the corresponding disk surfaces. In addition to the size of the openings 36, the factors which affect the rate of lubricant leaving the disk include the smoothness of the disk, the disk rotational speed, the viscosity of the lubricant, and the carrier design. When the disk is not rotating, the capillary action of the porous sponge-like material of annulus 32 holds the liquid inside the reservoir. While the preferred embodiment of the lubricant reservoir or holding means is the annular reservoir 30 described above and illustrated in FIG. 3, there are numerous alternative reservoirs which are possible. For example, in some applications where the total running time of the disk file is relatively short (e.g. several months), the means for holding the lubricant may be a non-data band or region on the disk near the inside diameter of the disk. During the normal disk lubrication process, the non-data band of the disk is also lubed, so that the non-data band contains an additional supply of lubricant for replenishment of the liquid film. In this embodiment for this specific application, it may also be desirable to use a lubricant which has a higher viscosity so that the rate of depletion is somewhat reduced.

Referring now to FIG. 4, the transducer carrier is illustrated with its skiing surface depicted as a plurality of ski feet 40, 42, 44 formed on a flat surface 43. The carrier may be formed from the conventional material used to manufacture air-bearing sliders, such as ferrite or an alumina and titanium-carbide ceramic material. The carrier 20 is shown as having a flat, generally planar surface onto which each of the ski feet is formed.

The ski foot 44 is near the trailing edge of the carrier, i.e. the portion of the carrier where the thin film transducer 46 or other magnetic recording head is supported on the carrier. Each of the ski feet is generally a truncated cone extending from surface 43 and with a generally circular shaped end which enables the carrier to ski on the lubricant film, regardless of the direction of movement of the carrier relative to the disk. In this manner the carrier is capable of skiing when supported on a rotary actuator which moves the carrier in a generally arcuate path wherein the direction of motion of the carrier relative to the disk varies depending upon the radial position of the carrier.

FIG. 5 illustrates an embodiment of the transducer carrier, denoted 20', wherein the ski feet 40, 42, 44 are formed on a conventional three-rail air-bearing slider, such as that described in assignees' U.S. Pat. No. 4,894,740. Each of the ski feet 40, 42, 44 is formed on the conventional bottom surface of the rails 50, 51, 52 by material etching the rails back a few thousand Angstroms, preferably by ion milling or alternatively by reactive ion etching, so that the ski feet are the remaining outer portions projecting outwardly from the rails of the slider. The ion milling is performed in a manner such that there is a very slight taper (approximately less than ten degrees) of the ski feet away from the outer surface of the rails, which results in the ski feet being formed as generally truncated cones. This slight taper of the ski feet allows the transducer carrier to actually ski on top of the relatively high viscosity lubricant film on the disk.

Figure 6:
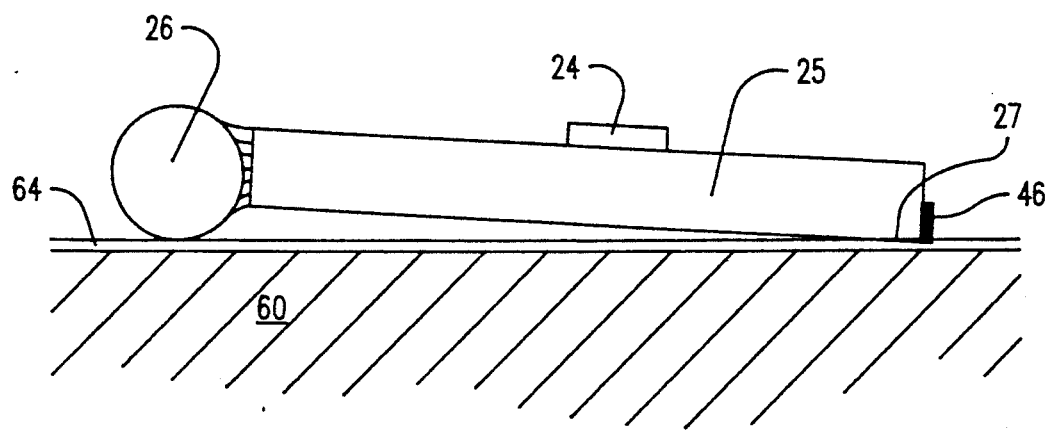
FIG. 6 is a side view of an alternative transducer carrier.

While the preferred embodiment of the skiing surface of the carrier is as depicted in FIGS. 4 and 5, the invention has also been successfully demonstrated with a skiing surface comprising one or more 1 mm. diameter tungsten-carbide ball bearings epoxy bonded to a conventional air-bearing slider. One embodiment of this type of carrier is shown in FIG. 6. The carrier is a conventional two-rail air-bearing slider 25 which has the transducer 46 located on its trailing edge. A single 1 mm. diameter tungsten-carbide ball bearing 26 is epoxy-bonded to the leading edge of slider 25. The ball bearing 26 serves as a front ski foot and raises the front end of slider 25 to cause the trailing edges of the rails, such as edge 27, to serve as rear ski feet.

Figure 7:
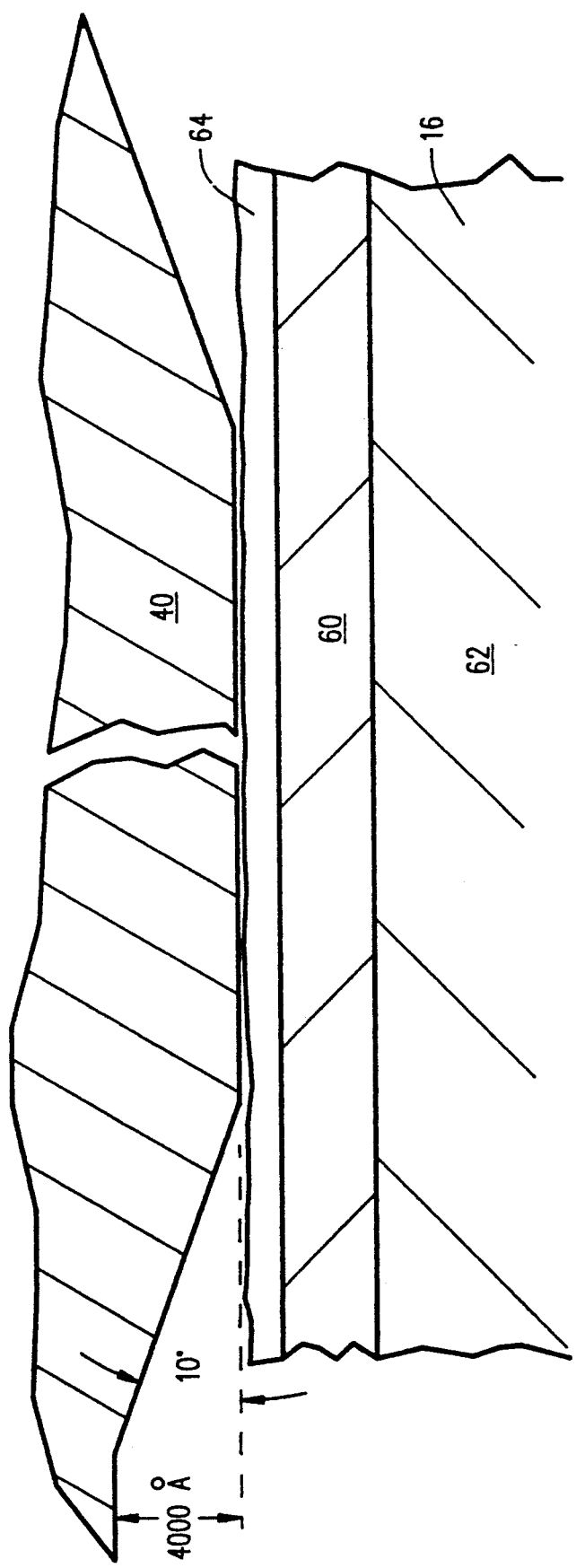
FIG. 7 is a sectional view of the carrier disk-interface of the present invention.

The interface between the transducer carrier and the disk with the lubricant film is illustrated in FIG. 7. In the preferred embodiment, the disk 16 has as its upper solid portion a conventional amorphous carbon overcoat film 60, which is typically approximately 250 Angstroms thick. The magnetic layer 62, such as a conventional cobalt alloy sputter deposited magnetic film, is located beneath the protective carbon overcoat 60. The liquid lubricant is deposited as a film 64, preferably to a thickness in the range of approximately 20 to 100 Angstroms, on top of the carbon overcoat 60. A portion of one of the ski feet 40 is depicted as being supported on the lubricant film 64. The end of ski foot 40 has a diameter of approximately 100 microns and is tapered at approximately a ten degree angle to an etch depth of approximately 4,000 Angstroms. The transducer 46 (FIG. 5) is supported on the trailing edge of the carrier 20 at the end of ski foot 44, and so is maintained at a spacing of approximately the lubricant film thickness (e.g. 20 to 100 Angstroms) from the top of the recording disk. During operation of the disk file the suspension 24 (FIG. 2) maintains a force on the carrier 20 forcing the ski feet 40, 42, 44 into contact with the lubricant film 64, which, because it is essentially incompressible, serves as a spacing layer between the carrier 20 and the disk 16. The relatively small angle between the end of ski foot 40 and the disk (10 degrees in FIG. 7) improves the ability of the carrier to ski as it provides less of a barrier to the lubricant which passes under the end of ski foot 40 during start up of the disk drive.

In the present invention it is possible to improve the overall performance of the disk file by maintaining a vacuum within the sealed housing. This can be accomplished by constructing the disk file to have an essentially hermetic seal, for example, in the manner such as described in assignee's U.S. Pat. Nos. 4,367,503 and 4,556,969.

Experimental Results

The invention has been demonstrated experimentally using a commercially available 2.5 inch rotary actuator disk drive with modification of some of the components.

The disk substrate used was manufactured without any intentional texture and polished as smooth as possible. Both aluminum and glass substrates were used, although aluminum is the preferred disk substrate. A CoPtCr alloy magnetic film was sputter deposited on top of a suitable underlayer, and a 250 Angstroms thick amorphous hydrogenated carbon overcoat was sputter deposited over the magnetic film. Lubricant was applied by dipping the disk in a dilute lubricant-solvent mixture, as is common in the industry, except that the lubricant was coated to about 100 Angstroms thickness. The exact coating thickness is not critical, however it is desirable to keep the lubricant film as thin as possible in order to minimize the head-disk spacing. The lubricant can be bonded to the carbon overcoat on the disk by ultraviolet (UV) or thermal treatment, or a lubricant which self-bonds at room temperature can be applied. Two classes of lubricants were used, perfluoro-poly ethers (PFPE) and hydrocarbons (HC), both of which are conventional disk lubricants. In particular, the PFPE Demnum SP from Daikin self-bonds at room temperature and can be applied by dipping. The HC lubricant, which may be a poly-1-decene type of hydrocarbon such as 174H available from William F. Nye, Inc., can be bonded using any of the techniques cited above. Preferably the PFPE lubricants are bonded, but the HC lubricants are not. The bonded lubricant, if there is any, comprises only a fraction of the total lubricant film thickness on the disk. The PFPE lubricants have a viscosity in the range of 5 centipoise to 10 poise and a molecular weight preferably greater than approximately 2000 amu. The HC lubricants have a viscosity in the range of 5 centipoise to 10 poise and a molecular weight preferably greater than approximately 1000 amu. The lubricant should have a viscosity which, when used with disks having a specified smoothness and operating at a specified rotational speed, is sufficient to both prevent excessive lubricant loss and support the skiing surface of the transducer carrier.

In the experiment, the carrier used was essentially that depicted in FIG. 5 and was made by starting with a slider with a working recording head and an existing air-bearing surface. Resist and lithography were used to define the ski feet on the polished rails 50,51,52 forming the air-bearing surface. The air-bearing surface was then ion-milled away (except where the resist defined the feet) a few thousand Angstroms to produce the feet. The preferred embodiment includes three feet, two feet toward the front of the air-bearing surface overhanging the taper slightly, and one foot at the rear which includes the recording head.

With this type of carrier and a disk file with an air atmosphere the result is that the front feet 40, 42 (FIG. 5) ski until full disk rotational speed is attained, and then the front feet "fly". The rear ski foot 44 continues to ski at all times. This also reduces the drag. The front ski feet are still required, however, for starting and stopping. The etching or milling depth along with the design of the conventional air-bearing surface are the parameters which can be adjusted to ensure that the front feet fly and that the rear foot skis over the desired range of velocities and suspension preload. For example, if the conventional air-bearing slider was designed to fly at 5000 Angstroms in the front and 1500 Angstroms in the back, then etching or milling away 3000 Angstroms of material from the slider rails would result in a carrier which had its rear foot skiing and its front feet flying at approximately 2000 Angstroms. If the carrier were that depicted in FIG. 4 all ski feet would ski at all times since there is no air-bearing surface to cause the front ski feet to fly.

A lubricant reservoir such as that described in FIG. 3 was installed in the disk drive. The reservoir sits pressed up against the disk toward the disk inside diameter, for example where the disk stack spacers would normally reside. In this manner the reservoir acts as both a lubricant holding means and a disk spacer. The reservoir contained four openings 36, each with a diameter of approximately 100 microns. The reservoir was filled with approximately 0.2 cc of lubricant. The lubricant used in the reservoir is typically the same as the lubricant placed on the disk.

After the disk and reservoir were installed in the disk drive, the carrier with a Watrous-type suspension having a 6 gram spring preload was installed, and the drive was operated.

The tests conducted on the drive included measurements of stiction, lubricant thickness, drag, wear of the data tracks by optical observation, magnetic reading and writing, and vibration resistance.

Figure 8:
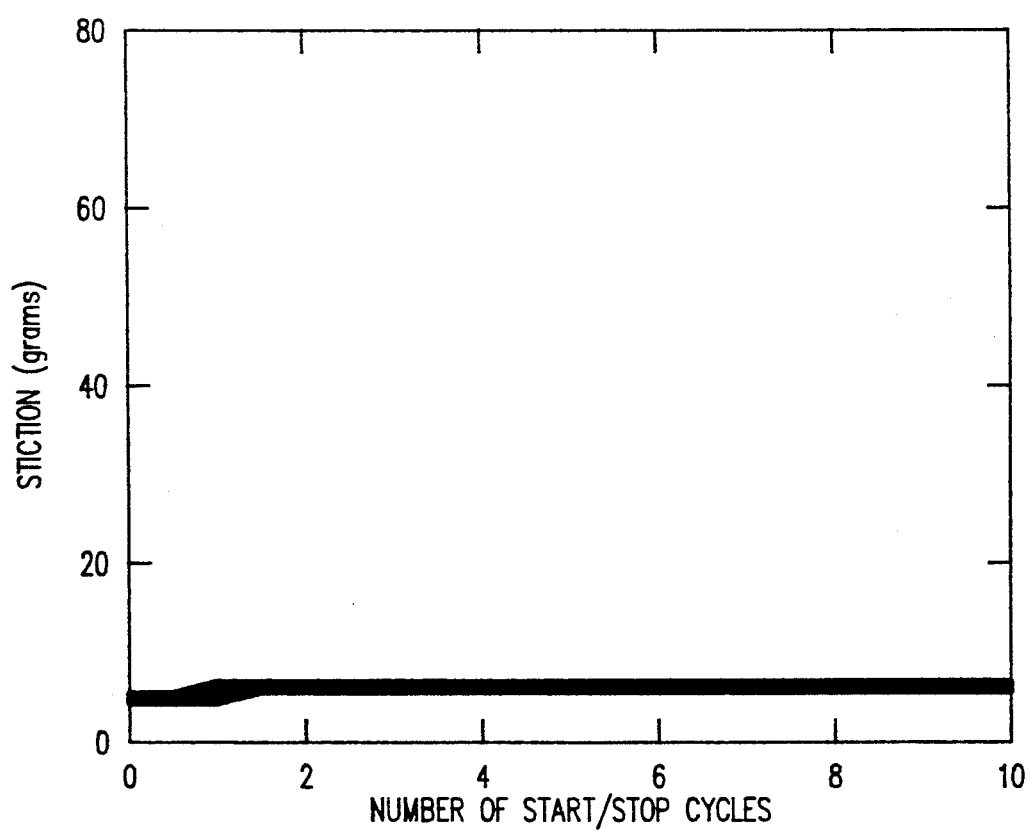
FIG. 8 is a graph of the stiction forces on the transducer carrier as a function of disk drive start/stop cycles.

The stiction measurements, plotted as a function of start/stop cycles in FIG. 8, show a low stiction value, even after 100 thousand start/stop cycles. The stiction force between the carrier and the disk was maintained in the range of 3 to 7 grams, which is well below the range where damage can occur to the head or disk at start up of the disk drive.

Lubricant thickness, as determined by visual observation (by video microscope) accompanied by ellipsometry, was measured to be between 20 and 100 Angstroms over the surface of the disk. Visual observation also confirmed that the reservoir dispenses lubricant to the disk surface, but only when the disk is spinning, and showed that the lubricant is smoothed by the skiing. The capillary action of the porous metal keeps the lubricant within the reservoir unless it is overcome by the centrifugal force of spinning. As the lubricant spreads out onto the disk, the movement of the carrier during accessing smooths the lubricant. To facilitate this smoothing, the carrier was accessed over all available tracks on the disk periodically, i.e. once every 5 minutes. This occasional accessing by the actuator to move the carrier over different radial regions on the disk was sufficient to smooth any irregularities in the thickness of the lubricant, caused for example by any non-uniform distribution of lubricant from the reservoir. Based on these experimental results it is estimated that for a single 2.5 inch disk in a drive operated at a conventional operating speed of 3600 RPM only approximately 0.01 cc of lubricant would be required to be maintained in the reservoir for the estimated seven year design life of the disk drive. This amount would be sufficient to replenish approximately 10 Angstroms of the lubricant film per day, assuming continuous operation over the seven year design life.

The drag was measured by strain gauges attached to the suspension. The drag was determined as a function of the velocity of the disk relative to the carrier, time, and lubricant thickness. In general the drag was maintained below 1 gram at operating velocities.

No wear of the disk was observed by optical measurements made with a resolution of better than 10 Angstroms of material loss.

Figure 9:
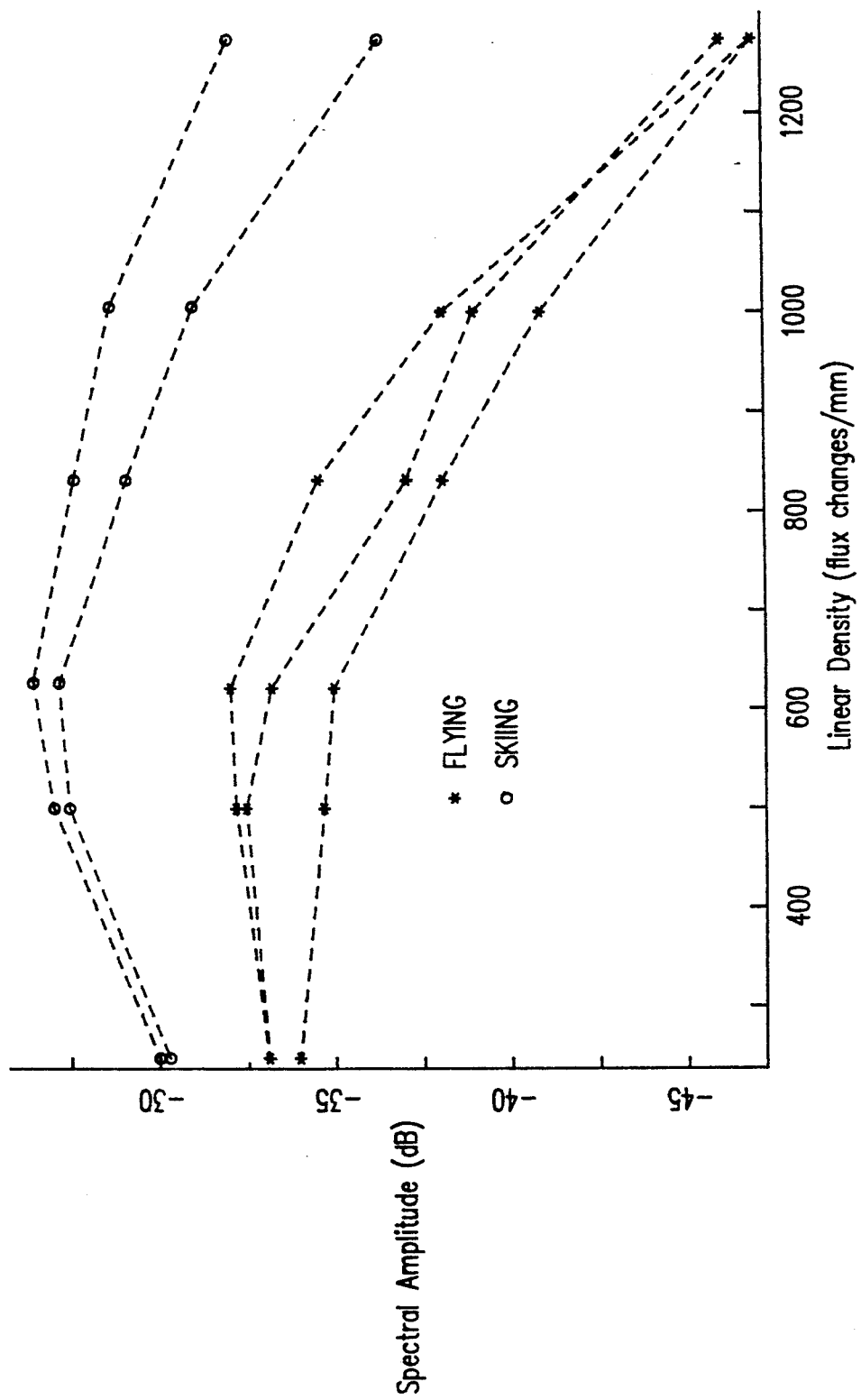
FIG. 9 is a comparison of frequency roll-off curves for a conventional air-bearing head-disk interface disk drive and the disk drive of the present invention.

Magnetic measurements were made to determine the improvement in recording performance due to the much closer head-disk spacing. The measured data showed larger overwrite, higher signal amplitude and better frequency roll-off curves than in a conventional air-bearing interface disk drive using the same head and disk. Referring to FIG. 9, the frequency roll-off curves show the significant improvement of the skiing carrier. The curves in FIG. 9 show that the signal amplitude is higher in the skiing case and that the response at high frequency falls off slower than in the flying case. This implies that higher recording densities will be obtained for the skiing case, which is a result of the reduced head-disk spacing.

Figure 10:
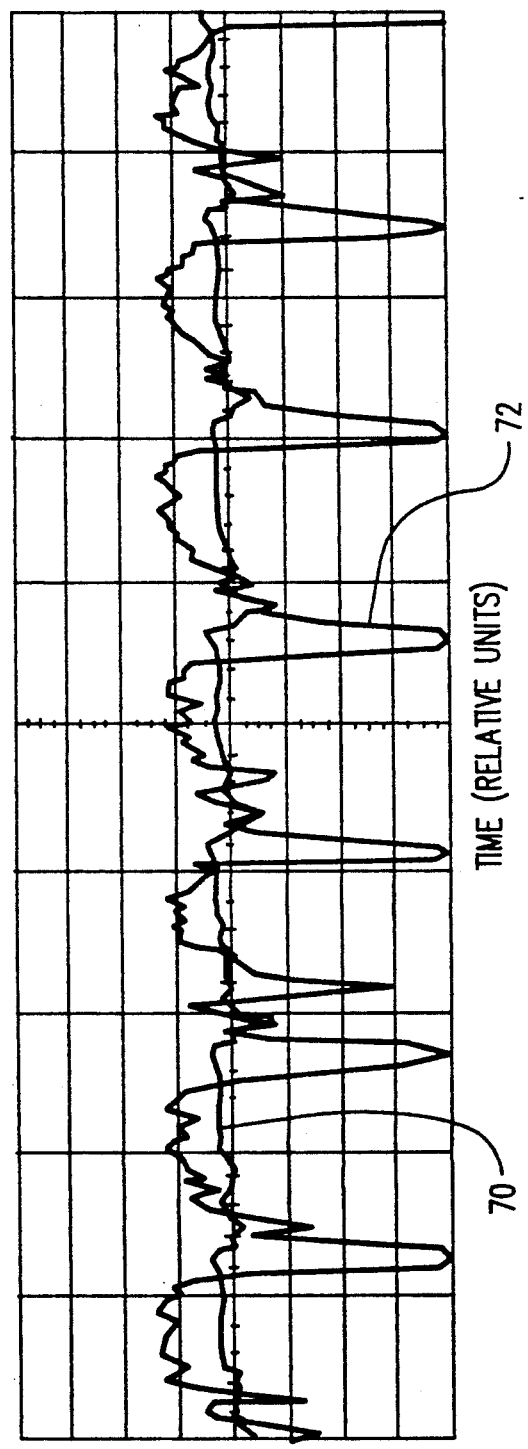
FIG. 10 is a graph of carrier-disk spacing for a conventional air-bearing head-disk interface and the head-disk interface of the present invention as a function of time during a vibration test.

In an experimental test for the vibration or impact resistance of a disk file with the transducer carrier, disk, and interface of the present invention, the commercially available 2.5 inch disk drive as modified was mounted on a shake apparatus. The transducer carrier was that depicted in FIG. 5 and was mounted by a conventional type of suspension to a rotary actuator. The disk was lubricated with 50 Angstroms of a PFPE type of lubricant, such as Demnum SP, by dipping the disk into the lubricant. The load provided by the suspension to bias the carrier onto the disk was 5.5 grams and the speed of the disk relative to the carrier was 7 meters per second. The acceleration test provided by the shaker was 30 G's forces at 70 cycles sinusoidal. The results of the carrier-disk spacing was measured by measuring the capacitance between the carrier and the disk and is depicted for this experimental device as line 70 on FIG. 10. The slider-capacitance measurement for the same type of disk drive, but with the conventional air-bearing interface, is depicted as line 72 in FIG. 10. The comparison of line 70 and line 72 illustrates the significant improvement in head-disk stiffness and disk drive impact resistance provided by the present invention.

The modified disk drive as described above was also tested in a vacuum environment by operating the drive within a vacuum chamber. The pressure was reduced in the chamber to $10^{-6}$ to $10^{-7}$ Torr. The test results obtained were essentially the same as those obtained when the drive was tested in the air environment.

While the preferred embodiments of the present invention have been illustrated in detail, it should be apparent that modifications and improvements may be made to the invention without departing from the spirit and scope of the invention as described in the following claims.

What is claimed is:

1. A transducer assembly for a data recording disk file of the type wherein a disk has a liquid film on its surface, the assembly comprising:
 - a carrier having an air-bearing surface near its front end for supporting the front end of the carrier above the liquid film when the disk is rotating at its operational speed and a ski foot near its rear end for skiing on the liquid film when the disk is rotating at its operational speed; and
 - a transducer attached to the carrier for reading data from or writing data to the disk.

2. The transducer assembly according to claim 1 wherein the ski foot comprises a generally truncated cone having a generally circularly shaped end.

3. The transducer assembly according to claim 1 wherein the transducer is located on the carrier near the ski foot.

4. The transducer assembly according to claim 1 wherein the ski foot is generally spherically shaped.

5. The transducer assembly according to claim 1 further comprising means for connecting the carrier to the actuator of the disk file, the carrier to actuator connecting means including means for biasing the ski foot of the carrier into contact with the liquid film on the disk.

6. The transducer assembly according to claim 5 wherein the carrier to actuator connecting means includes means for providing generally gimballed movement of the carrier, whereby the carrier may pitch and roll as its ski foot is forced into contact with the lubricant film during rotation of the disk.

7. A transducer assembly for a data recording disk file of the type wherein a disk has a liquid film on its surface, the assembly comprising:
 - an air-bearing slider having a plurality of rails and a plurality of ski feet extending from the rails for skiing on the liquid film; and
 - a transducer attached to the slider for reading data from or writing data to the disk.

8. The transducer assembly according to claim 7 wherein each of the ski feet has an end which forms an angle relative to the disk surface small enough to permit the end of the ski foot to ski on the lubricant film on the disk.

9. A transducer assembly for a data recording disk file of the type wherein a disk has a liquid film on its surface, the assembly comprising:
 - an air-bearing slider having a plurality of rails and at least one ski foot extending from one of the rails for skiing on the liquid film; and
 - a transducer attached to the slider for reading data from or writing data to the disk.

* * * * *

UNITED STATES PATENT AND TRADEMARK OFFICE
CERTIFICATE OF CORRECTION

PATENT NO. : 5,200,867
DATED : April 6, 1993
INVENTOR(S) : Albrecht et al.

It is certified that error appears in the above-identified patent and that said Letters Patent is hereby corrected as shown below:

Abstract, line 18, "high" should read "low".

Col. 2, line 16, "low" should read "high".

Col. 2, line 60, "high" should read "low".

Signed and Sealed this

Third Day of May, 1994

Attest:

BRUCE LEHMAN

Attesting Officer

Commissioner of Patents and Trademarks